(12) United States Patent
Iyoda et al.

(10) Patent No.: US 7,985,829 B2
(45) Date of Patent: Jul. 26, 2011

(54) METHOD FOR PRODUCING POLYPYRIDINIUM

(75) Inventors: Tomokazu Iyoda, Tokyo (JP); Kaori Kamata, Yamato (JP); Yukimitsu Suzuki, Atsugi (JP)

(73) Assignee: Japan Science and Technology Agency, Saitama (JP)

( * ) Notice: Subject to any disclaimer, the term of this patent is extended or adjusted under 35 U.S.C. 154(b) by 791 days.

(21) Appl. No.: 10/593,176

(22) PCT Filed: Mar. 23, 2005

(86) PCT No.: PCT/JP2005/005180
§ 371 (c)(1),
(2), (4) Date: Jan. 22, 2008

(87) PCT Pub. No.: WO2005/090443
PCT Pub. Date: Sep. 29, 2005

(65) Prior Publication Data
US 2008/0132676 A1 Jun. 5, 2008

(30) Foreign Application Priority Data
Mar. 23, 2004 (JP) .................. 2004-084518

(51) Int. Cl.
*C08G 73/06* (2006.01)
*C08G 73/00* (2006.01)

(52) U.S. Cl. .................. 528/423; 528/424; 528/482

(58) Field of Classification Search .................. 528/423, 528/424, 482
See application file for complete search history.

(56) References Cited

PUBLICATIONS

Takahashi et al; Synthesis and Electrochemical Property of polypyridinium; Electronic Science, the 71st Coference, Mar. 24, 2004; p. 8.*

* cited by examiner

*Primary Examiner* — Duc Truong
(74) *Attorney, Agent, or Firm* — Jenkins, Wilson, Taylor & Hunt, P.A.

(57) ABSTRACT

A production method for polypyridinium having a narrow molecular weight distribution and a desired molecular weight is provided. Polypyridinium 3 having a narrow molecular weight distribution and a desired molecular weight is synthesized by allowing a pyridine derivative monomer 2 to polymerize on a polymerization initiator 1 such as a specially designed 4-halopyridinium and the like in the presence of a dissolution accelerating agent, such as tetrabutyl ammonium tetrafluoroborate, that dissolves the polymer formed in a solvent as in the chemical below.

[Chemical Equation 4]

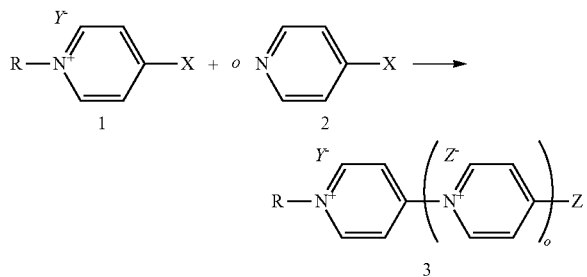

where Y represents an anion that dissolves in an organic solvent, X and Z represent halogen atoms, R represents hydrocarbon groups and the like and o is about 1 to 300.

19 Claims, 5 Drawing Sheets

METHOD FOR PRODUCING POLYPYRIDINIUM

FIELD OF THE INVENTION

The present invention relates to a method for producing polypyridinium and more particularly to a method for producing polypyridinium that can control molecular weight distribution.

PRIOR ART

Pyridinium derivatives are ionic molecules having photo-electrochemical oxidation-reduction capability. Taking advantage of this characteristic, pyridinium derivatives are used in a broad range of applications such as chromic materials, disinfecting surfactants and the like. These functions are observed due to the formation of pyridinyl radicals during an oxidation-reduction process and the interaction among them. Therefore, a polycationic polypyridinium constructed from minimal units comprising pyridinium linked into a conjugated chain is a very interesting, strongly interrelated polymer with a multistage oxidation-reduction property. Reports on the synthesis of such a polymer through a halopyridine self-condensation have been published (References 1-3). However, the polymerization mechanism has not been elucidated and the molecular weight has not been controlled due to the low solubility of the polymer obtained.

In addition, a method in which a 1,4-pyridinium salt is allowed to polymerize in the presence of an inorganic compound such as sodium tetrafluoroborate in an organic solvent to obtain a poly(1,4-pyridinium) salt has been disclosed (Reference 4), but the molecular weight could not be controlled.

Reference 1: Recueil Vol. 78, 593-603 (1959)

Reference 2: Journal of Polymer Science: part C, No. 16, pp. 369-375 (1967)

Reference 3: Polymer International 35 (1994) 67-74

Reference 4: Japanese Patent Application Public Disclosure (Kokai) No. 04-293931

Problems to be Solved by the Invention

The present invention provides a method for producing polypyridinium that can yield a polymer with a desired molecular weight while maintaining a narrow molecular weight distribution, such as a ratio of the weight average molecular weight to the number average molecular weight of 1.5 or less.

Means to Solve the Problems

The inventors studied a consecutive chain polymerization using pyridinium salt as an initiator and investigated the reactivity of a 4-chloropyridine monomer and polypyridinium synthesis. As a result, the inventors discovered a production method for a polypyridinium having a narrow molecular weight distribution and a desired molecular weight, and the present invention was completed.

That is, the present invention is a method for producing polypyridinium comprising reacting a polymerization initiator and a monomer represented by the chemical formula below in an organic solvent in the presence of a dissolution accelerating agent comprising hydrophobic anions,

[Chemical Formula 1]

where R' represents a hydrogen atom, an alkyl group, an alkoxy group, a halogen atom, a nitro group, an ester group or an aromatic ring forming a condensed ring with the pyridine ring, m is an integer from 1 to 4 and Z represents a halogen atom, wherein the polymerization initiator is 4-halopyridinium or its derivatives, 4-haloquinolinium or its derivatives, 9-haloacrydinium or its derivatives, 2- or 4-halopyrimidine or their derivatives, 3- or 4-halopyridazine or their derivatives, 2-halopyrazine or its derivatives, 2-, 4- or 5-haloimidazole or their derivatives, 3-, 4- or 5-halopyrazole or their derivatives, 3-, 4- or 5-haloisothiazole or their derivatives, 3-, 4- or 5-haloisooxazole or their derivatives, halotriazine, mononitro or polynitrohalobenzene or their derivatives, or polycyanohalobenzene or its derivatives.

Advantages of the Invention

A conventional halopyridine thermal polymerization proceeds self-catalytically. That means that the rate of nucleophilic reaction on the carbon in position four in the halopyridinium structure in the growth termini of the dimer [N-(4-halopyridinio) pyridine] or the oligomer formed is overwhelmingly faster than the rate of nucleophilic reaction on the carbon in position four of the halopyridine monomer in the initial polymerization stage. This difference is attributed to the electron density in the initiator and the position four carbon in the halopyridinium structure seen in the growth termini being sufficiently lower than the electron density of the position four carbon in the halopyridine monomer and nucleophilic attack by the nitrogen in the halopyridine monomer occurring readily. Therefore, a halopyridinium derivative, a top priority target in a nucleophilic attack by a halopyridine monomer, is separately synthesized in the polymerization reaction of the present invention and is used as the initiator. As shown in the Examples, a narrow molecular weight distribution and a desired molecular weight can be achieved by allowing prioritized growth from the initiator to occur in a temperature range in which a halopyridine self-catalyzed thermal polymerization does not occur. Therefore, the polymerization reaction of the present invention satisfies the conditions of chain polycondensation reactions.

DETAILED DESCRIPTION OF THE INVENTION

The reaction of the present invention is represented by the equation below when a polymerization initiator is a halopyridine derivative. The symbols have the same definition as in chemical formulae 1 and 2.

[Chemical Equation 4]

That is, polypyridinium 3 having a narrow molecular weight distribution and a desired molecular weight is synthesized by allowing a pyridine derivative monomer 2 to polymerize on a specially designed polymerization initiator 1 in the presence of a dissolution accelerating agent that dissolves the formed polymer in a solvent. In the equation, o is about 1 to 300 and other abbreviations will be explained later.

Figure 1:
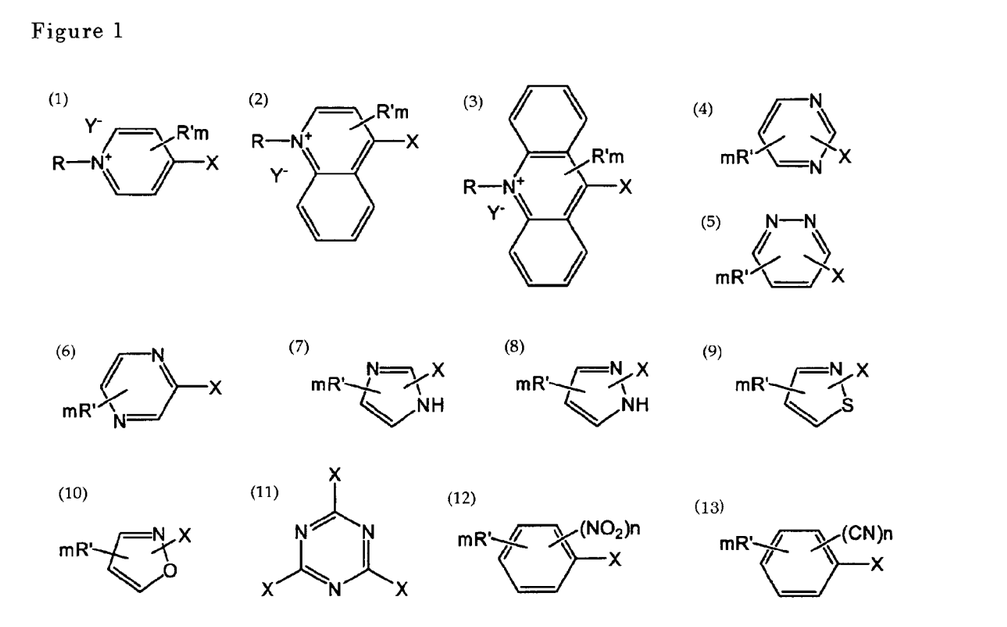
FIG. 1 shows examples of the polymerization initiator. The symbols in the figure are the same as defined in chemical formulae 1 and 2.

The polymerization initiator of the present invention is a nitrogen containing compound with enhanced electrophilicity in the attacked segments in order to make the segment more receptive to attacks by a monomer that is a halopyridine or its derivatives. Such a polymerization initiator may be 4-halopyridinium or its derivatives [FIG. 1(1) with the symbols in the figure defined in the same manner as in chemical formulae 1 and 2 and henceforth the same applies], 4-haloquinolinium or its derivatives [FIG. 1(2)], 9-haloacrydinium or its derivatives [FIG. 1(3)], 2- or 4-halopyrimidine or their derivatives [FIG. 1(4)], 3- or 4-halopyridazine or its derivatives [FIG. 1(5)], 2-halopyrazine and its derivatives [FIG. 1(6)], 2-, 4- or 5-haloimidazole and their derivatives [FIG. 1(7)], 3-, 4- or 5-halopyrazole or their derivatives [FIG. 1(8)], 3-, 4- or 5-haloisothiazole or their derivatives [FIG. 1(9)], 3-, 4- or 5-haloisoxazole or their derivatives [FIG. 1(10)], halotriazine [FIG. 1(11)], mononitro or polynitrohalobenzene or their derivatives [FIG. 1(12)] or polycyanohalobenzene or its derivatives [FIG. 1(13)].

Of these, halopyridine derivatives with enhanced electrophilicity in the position four carbon in a halopyridine derivative are particularly preferred and are represented by the chemical formula below.

[Chemical Formula 2]

R represents R"(CH$_2$)$_n$— or an aryl group or a heterocyclic ring that may contain substituents, R" represents a hydrocarbon group or a heterocyclic group. This hydrocarbon group refers to an alkyl group, a linear hydrocarbon group containing double bonds, a cycloalkyl group, an aryl group or an aralkyl group.

n represents an integer at least 1, preferably 1 to 3 and most preferably 1.

R' represents a hydrogen atom, an alkyl group, an alkoxy group, a halogen atom, a nitro group or an ester group substituent or an aromatic ring forming a condensed ring with a pyridine ring, and a hydrogen atom is preferred. As the aromatic ring that forms a condensed ring with a pyridine ring, a benzene ring or a naphthalene ring may be cited and a benzene ring is preferred. When a pyridine ring forms a condensed ring with one benzene ring, the condensed ring is a quinoline ring. When a pyridine ring forms a condensed ring with two benzene rings, the condensed ring is an acrydine ring. These aromatic rings may also contain one or multiple numbers of the substituents listed above.

m represents an integer of 1 to 4. However, m is 1 when the condensed ring described above is a quinoline ring, and m is 2 in the case of acrydine.

The aryl group is preferably a phenyl group or a naphthyl group.

The heterocyclic group is preferably a heterocyclic group containing N, O or S. As the heterocyclic group, monocyclic heterocyclic groups such as a furyl group, a thienyl group, a pyrrolyl group, an imidazolyl group, a pyrazolyl group, a thiazolyl group, an isothiazolyl group, an oxazolyl group, an isoxazolyl group, a triazolyl group, an oxadiazolyl group, a thiadiazolyl group, a tetrazolyl group, a pyridyl group, a pyrimidinyl group, a pyridazinyl group, a pyradinyl group and the like or polycyclic heterocyclic groups obtained by a ring condensation of these monocyclic heterocyclic groups amongst themselves or with an aromatic ring such as a benzene ring, a naphthalene ring and the like may be cited. Of these, heterocyclic groups containing nitrogen are preferred. In the polymerization initiator, the carbon atom of this heterocyclic group needs to be bonded to the nitrogen atom of the pyridine ring.

These aryl groups and heterocyclic groups may also contain one or multiple numbers of substituents. As these substituents, an alkyl group, an alkoxy group, a halogen atom, a hydroxyl group, an amino group, a nitro group, a silyl group (—SR'''$_3$: R''' may be identical or different and represents hydrogen groups, hydroxyl groups, alkyl groups, halogen atoms, alkoxy groups and the like) and the like may be cited.

The following groups may be cited as examples of R,

[Chemical Formula 5]

-continued where G represents a substituent and p represents an integer.

X represents a halogen atom and preferably represents a chlorine atom or a bromine atom.

Y represents an anion dissolved in an organic solvent used in this reaction. As such an anion, a halide ion, a perchlorate ion, a tetrafluoroborate ion, a hexafluorophosphate ion, a tetraphenylborate ion and the like may be cited.

In addition, the monomer used in the present invention is represented by the following chemical formula.

[Chemical Formula 1]

In the formula, Z represents a halogen atom, preferably a chlorine atom or a bromine atom. R' and m are independently similarly defined as above.

The dissolution accelerating agent used in the present invention functions to enable the synthesis of a high molecular weight polypyridinium with a narrow molecular weight distribution by efficiently ion exchanging the halide ion released as the polymerization progresses with a hydrophobic anion and making the polymer formed soluble in the organic solvent to allow the polymerization reaction to progress uniformly and comprises a hydrophobic anion. This hydrophobic anion is, for example, a perchlorate ion, a tetrafluoroborate ion, a hexafluorophosphate ion, a tartarate ion, a citrate ion, a nicotinate ion, a phosphate ion containing a binaphthyl group and the like. In addition, this dissolution accelerating agent may be identical to the anion (Y) dissolved in the organic solvent described above, but dissolution of an even higher concentration of a polymer material is required. As far as this solubility is concerned, the more soluble the better as long as it is specifically at least 0.01 mole/liter.

This type of hydrophobic anion may be obtained by adding the following dissolution accelerating agent to a reaction system. As such a dissolution accelerating agent, for example, tetrabutyl ammonium perchlorate, tetrabutyl ammonium tetrafluoroborate, tetrabutyl ammonium hexafluorophosphate, sodium perchlorate, sodium tetrafluoroborate, sodium hexafluorophosphate, tetraethylammonium perchlorate, tetraethylammonium tetrafluoroborate, tetraethylammonium hexafluorophosphate, sodium tetraphenylborate, sodium p-toluenesulfonate, sodium alkylsulfonate having 6 to 24 carbon atoms, sodium alkylphosphate having 6 to 24 carbon atoms, phospholipids having 6 to 24 carbon atoms and the like may be cited.

When a dissolution accelerating agent (AB) is not used, the halide ion ($Z^-$) freed from the monomer as the polymerization progresses forms an anion with the polymer to decrease the solubility, thus separating out from the reaction solution immediately after the polymerization and eliminating the hope of increasing the degree of polymerization. However, when a dissolution accelerating agent is added, the ion exchange reaction ($Z^-$, $Y^- \rightarrow B^-$) of the following equation is thought to occur maintaining the solubility of the polymerized material.

[Chemical Equation 6]

In the equation, AB represents a dissolution accelerating agent, and $B^-$ represents a hydrophobic anion. Other abbreviations are as defined above.

As the organic solvent used in the present invention, polar solvents, which is solvents with high dielectric constant, suited for dissolving ionic compounds are preferred and nonpolar solvents are not preferred. Water is a good solvent for ionic compounds but is not desirable since polypyridinium is decomposed in aqueous solutions. As such a solvent, methanol, ethanol, isopropyl alcohol, acetone, acetonitrile, pyridine, dioxane, dimethyl sulfoxide, dimethyl formamide, ethyl acetate, propylene carbonate, chloroform, methylene chloride, sulfolane, acetic acid, nitromethane, nitrobenzene and the like, for example, may be cited.

The concentration of the dissolution accelerating agent in a reaction solution depends on the degree of solubility in the polymerization solvent, but it is ordinarily from about 0.01 mole/liter to 5.0 moles/liter. The concentration of the anion (Y) dissolved in an organic solvent is about the same as the concentration of the dissolution accelerating agent.

The concentration of the polymerization initiator in a reaction solution is ordinarily from 0.0001 mole/liter to 5.0 moles/liter, but it is preferable to set the concentration according to the addition ratio, which is the ratio of the amounts present of a monomer to an initiator.

The monomer concentration in a reaction solution is set according to the addition ratio, which is the ratio of the amounts present of a monomer to an initiator, but it is, for example, from 0.01 mole/liter to 5.0 moles/liter.

However, the upper limits of these concentrations are limited by the degrees of solubility in the solvent used.

The reaction temperature is ordinarily from about 0° C. to 70° C., preferably about 10° C. to 70° C.

In addition, the polymerization rate is proportional to the product of the concentrations of the polymerization initiator and the monomer and is dependent on the added concentrations of both. Furthermore, the polymerization rate is also changed extensively by the polymerization temperature. Therefore, the reaction time may be from several minutes to several days.

This reaction material may be allowed to react with a polymerization terminator to terminate the polymerization of polypyridinium. For example, a polymerization terminator may be added to the reaction solution described above to terminate the polypyridinium polymerization.

Nucleophilic reagents with a more powerful basicity than the monomer used in the polymerization are targeted as the polymerization terminator. As such a polymerization terminator, pyridine, quinoline, and acrydine and their derivatives substituted with electron donating groups such as amino groups, alkoxy groups and alkyl groups and the like, triphenyl phosphine and its derivatives, and amine derivatives substituted with alkyl groups or allyl groups, for example, may be cited. In addition, terminating agents function as long as these functional groups are contained in one section of the molecular structure, and they may be contained in molecules immobilized on a solid surface.

The concentration of the polymerization termination agents in a reaction solution is ordinarily from 0.01 mole/liter to 5 moles/liter.

Polypyridinium represented by the following chemical formula may be produced using the production method above.

[Chemical Formula 3]

In the formula R, Z, R' and m are as defined above. o is from 1 to 300.

The following Examples illustrate the present invention, but it is not intended to restrict the scope of the present invention.

SYNTHESIS EXAMPLE 1

Monomer Synthesis

Figure 2:
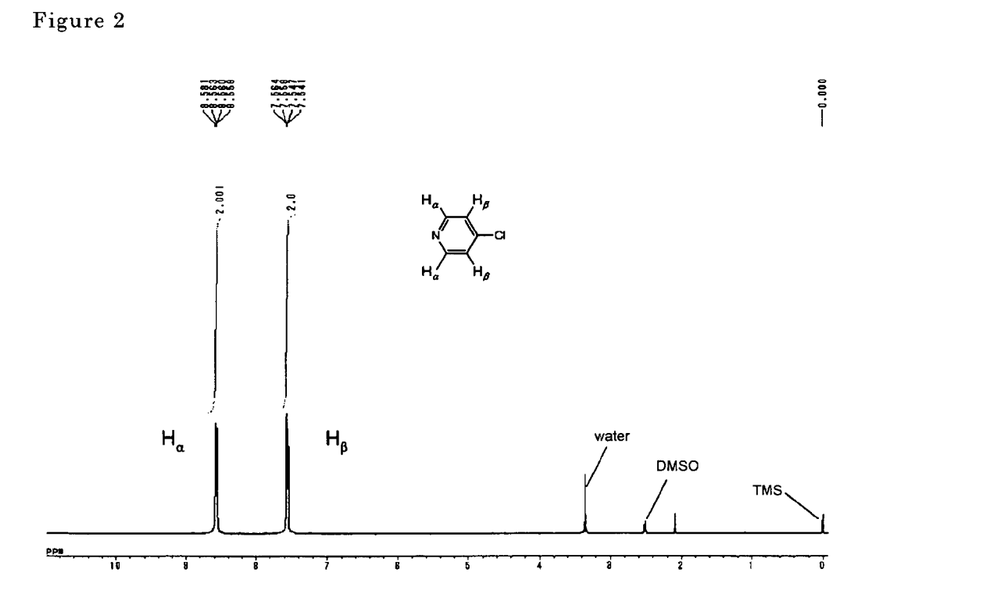
FIG. 2 is the $^1$H-NMR for 4-ClPy used as a monomer in the Examples.
Figure 3:
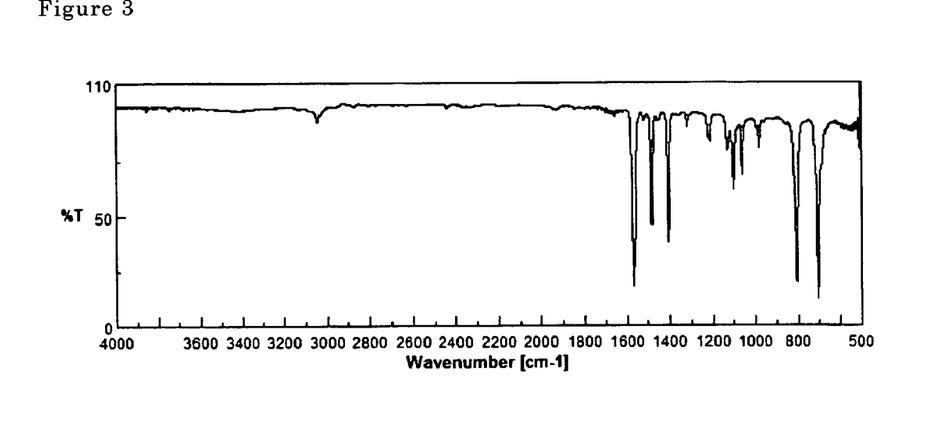
FIG. 3 is the FT-IR for the 4-ClPy used as a monomer in the Examples. Ar—Cl stretching vibration: 1102.1 cm$^{-1}$; C=C ring stretching motion: 1404.4, 1480.6 and 1566.9 cm$^{-1}$.

4-Chloropyridine hydrochloride (Kanto Kagaku, 5.0 g, 33.0 mmoles) was dissolved in 10 ml of pure water, and a 5.0 weight % aqueous sodium bicarbonate solution was used to neutralize the solution using an ice bath. The 4-chloropyridine formed was extracted using ether (50 ml, three times) and was dried using magnesium sulfate. The ether solution was distilled under reduced pressure using an ice bath, and 3.44 g (91% yield) of 4-chloropyridine (4-ClPy), a colorless and clear liquid, was obtained. The product was identified using $^1$H-NMR (DMSO-d6) and FT-IR (KBr pellet). The $^1$H-NMR is shown in FIG. 2, and the FT-IR is shown in FIG. 3.

SYNTHESIS EXAMPLE 2

Polymerization Initiator Synthesis

Figure 4:
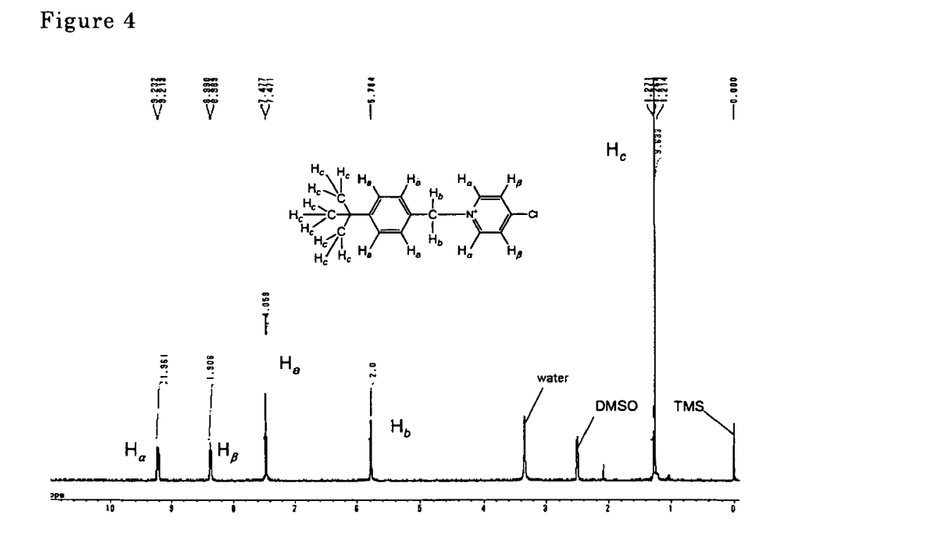
FIG. 4 is the $^1$H-NMR for the t-BBPy used as the polymerization initiator in the Examples.
Figure 5:
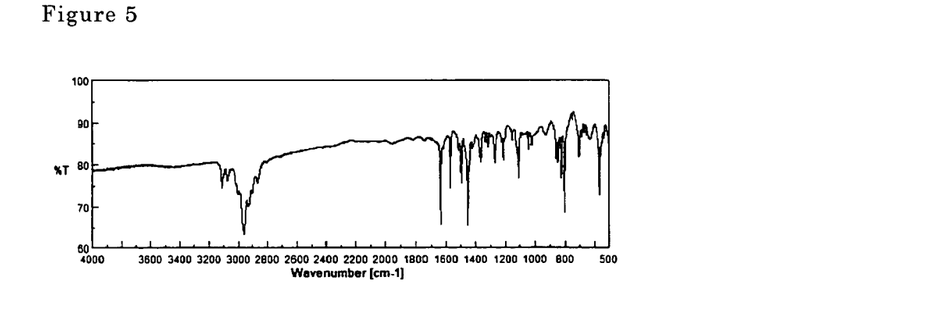
FIG. 5 is the FT-IR for the t-BBPy used as the polymerization initiator in the Examples. Ar—Cl stretching vibration: 1108.4 cm$^{-1}$; C=C ring stretching motion: 1452.6, 1496.0, 1567.4 and 1634.9 cm$^{-1}$; Methyl C—H stretching motion: 2960.2 cm$^{-1}$.

The 4-ClPy (0.26 g, 2.3 mmoles) obtained in Synthesis Example 1 was gradually added dropwise to 4-tert-butylbenzyl bromide (Wako Junyaku, 5.20 g, 23.0 mmoles), and the reaction mixture was agitated for five hours at room temperature. The yellow solids that separated out were filtered, washed with ether and recrystallized using ethanol to obtain N-(4'-tert-butylbenzyl)-4-chloropyridinium (t-BBPy). The yield was 0.76 g (97% yield). The product was identified using $^1$H-NMR (DMSO-d6) and FT-IR (KBr pellet). The $^1$H-NMR is shown in FIG. 4, and the FT-IR is shown in FIG. 5.

EXAMPLE 1

Figure 6:
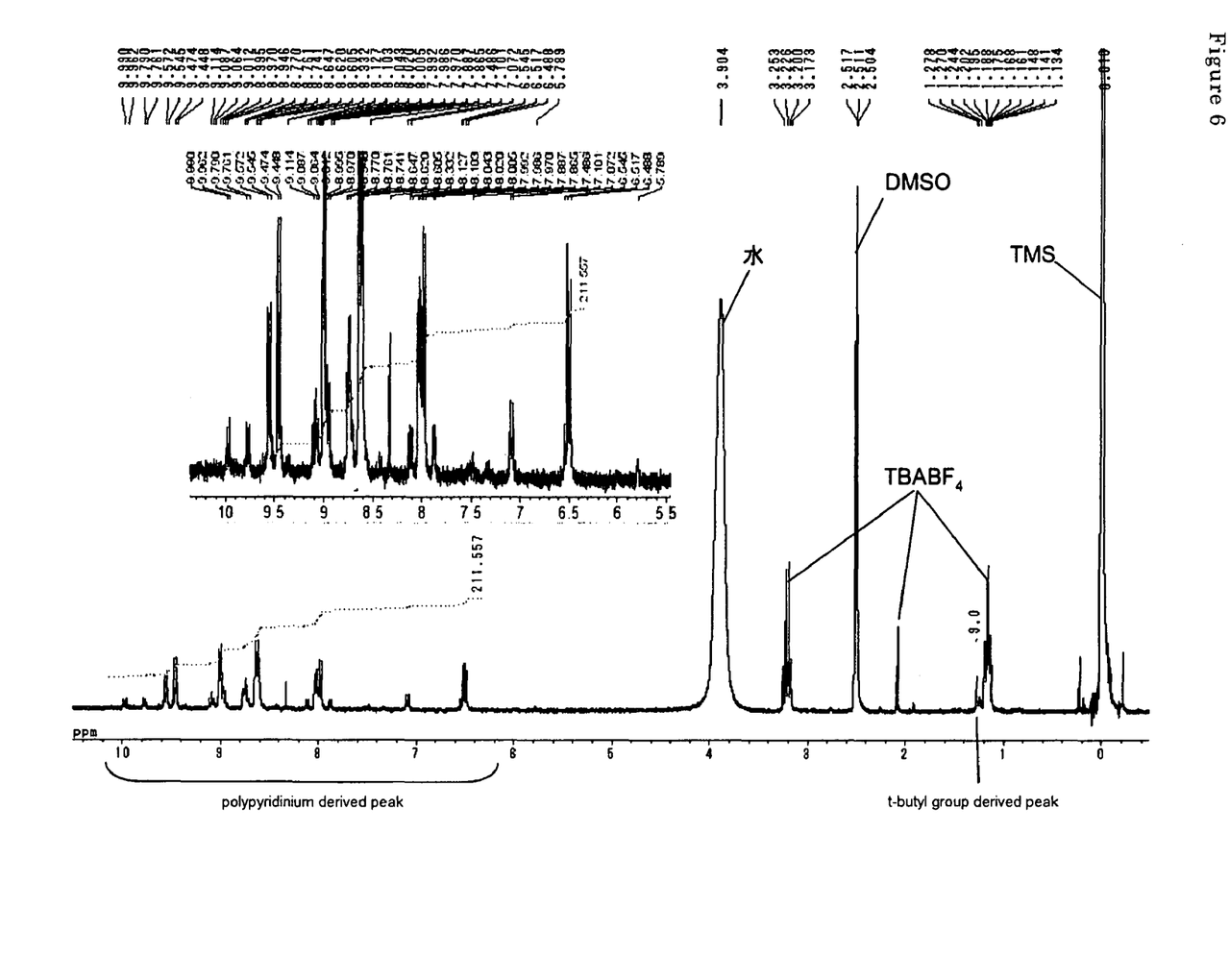
FIG. 6 is the $^1$H-NMR for the polypyridinium synthesized in the Examples.

The t-BBPy (3.0 mg, 0.009 mmoles) obtained in Synthesis Example 2 and tetrabutyl ammonium tetrafluoroborate (TBABF$_4$, manufactured by Tokyo Kasei, 197 mg, 0.598 mmole) were dissolved in 0.1 ml of acetonitrile, and the solution was added to a test tube containing 4-ClPy (57 mg, 0.50 mmole) obtained in Synthesis Example 1. After the mixture was heated for thirty minutes at 60° C., the conversion rate reached 80% and the polymerization progressed in a uniform system. The reaction system was allowed to cool to room temperature, and the solvent was removed using distillation. The yellow brown solids obtained were washed using ether and were dried under vacuum at room temperature. The average degree of polymerization of the polypyridinium was calculated to be 52 based on the $^1$H-NMR. The structure of the polypyridinium was identified by $^1$H-NMR (DMSO-d6). The $^1$H-NMR is shown in FIG. 6.

This polymer (polypyridinium) was a polycation, and its molecular weight was difficult to calculate reliably using the current analytical technology. However, $^1$H-NMR and gel chromatography were used to obtain the following experimental facts.

Figure 7:
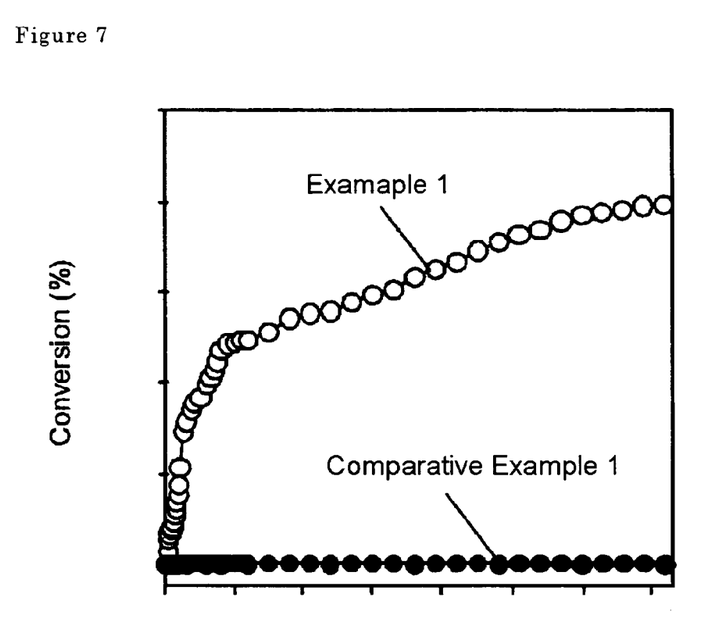
FIG. 7 shows the relationship between the monomer conversion ratio in a 4-ClPy polymerization reaction and the average molecular weight of the polypyridinium polymer. The open circles ○ indicate Example 1 (used an initiator) and filled circles ● indicate Comparative Example 1 (no initiator used).

The average molecular weight could be calculated using a quantitative terminal analysis since the structure of one of the termini of the polymer is derived from the initiator t-BBPy. More specifically, the protons of the t-butyl group appearing at about 1.3 ppm in the $^1$H-NMR and the protons of the polymer polypyridinium appearing from 6 ppm to 10 ppm were examined, and the average molecular weight was calculated using the ratio of the integrated areas of both. As a result, as shown in FIG. 7, the average molecular weight was seen increasing with the increasing monomer conversion ratio.

Figure 8:
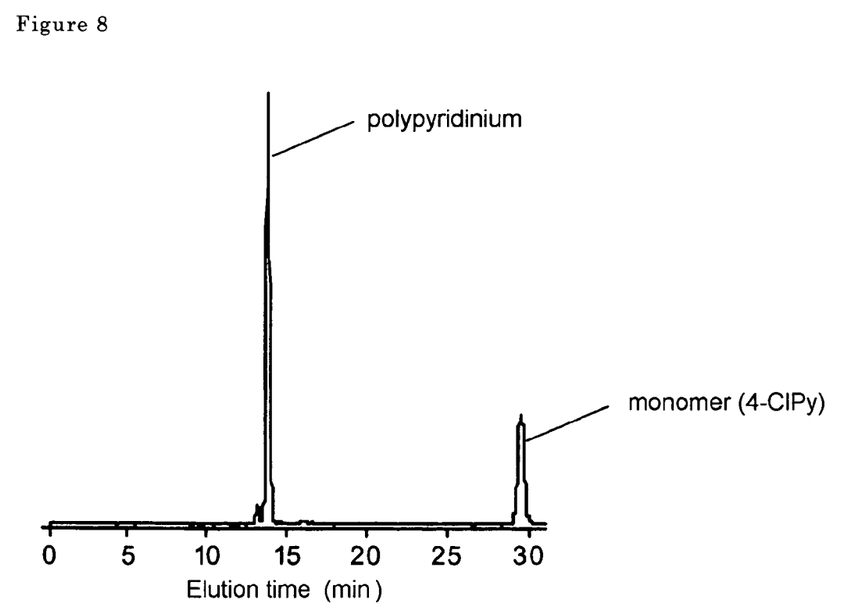
FIG. 8 is the gel chromatography for the polymer.

Furthermore, a gel chromatography of the polymer was conducted using a packed GPC column (Showa Denko, Asahipak GF-310 HQ) suitable for use with both aqueous and organic solvents and suited for separation and analysis of hydrophilic substances that are not retained by a reverse phase column. As shown in FIG. 8, an elution curve was obtained on the high molecular weight side of the exclusion limit molecular weight (40,000). An accurate molecular weight and the molecular weight distribution could not be obtained since a polycationic standard substance with a known molecular weight was not available, but the molecular weight distribution was shown to be narrow.

EXAMPLE 2

Figure 9:
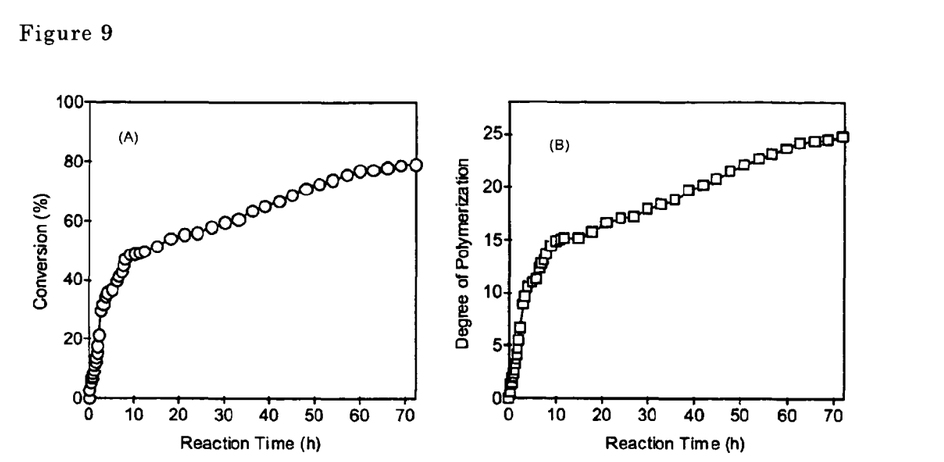
FIG. 9 shows the time dependent changes for the 4-ClPy conversion ratio and polypyridinium average molecular weight.

The t-BBPy (1.0 mg, 0.0036 mmole) obtained in Synthesis Example 2 and TBABF$_4$ (manufactured by Tokyo Kasei, 79 mg, 0.24 mmole) were dissolved in 0.4 ml of dimethyl sulfoxide, and the solution was added to an NMR tube to which 4-ClPy (11 mg, 0.10 mmole) obtained in Synthesis Example 1 had been added. The polymerization was allowed to proceed at 40° C., and the system was checked every thirty minutes. The time dependent changes in the 4-ClPy conversion ratio and polypyridinium average molecular weight are shown in FIG. 9. In the figure, A shows the time dependent changes in the 4-ClPy conversion ratio and B shows the time dependent changes in the polypyridinium average molecular weight.

COMPARATIVE EXAMPLE 1

The same reaction described in Example 1 was allowed to occur without using a polymerization initiator (t-BBPy). As shown in FIG. 7, the polymerization reaction did not proceed within the accuracy of the measurement.

COMPARATIVE EXAMPLE 2

The same reaction described in Example 1 was allowed to occur without using a dissolution accelerating agent (TBABF$_4$), and the polymerization reaction proceeded in a heterogeneous system. The yellow brown solids that separated out were filtered, washed using ether and dried. The average molecular weight could not be calculated using $^1$H-NMR due to the low solubility of the product present in the form of a polycation anion pair with the halide ion, and thermal polymerization in the absence of an initiator resulted in a broad molecular weight distribution.

EXAMPLE 3

4-Chloropyridine (300 mM) was allowed to polymerize (the ratio of the monomer to the initiator was one to one hundred) in dimethyl sulfoxide using N-(4-tert-butylbenzyl)-4-chlropyridinium bromide (3 mM) as the initiator and tetrabutyl ammonium tetrafluoroborate (360 mM) as the dissolution accelerating agent. The product was referred to as A.

For comparison, 4-chloropyridine was allowed to polymerize in the absence of a solvent. The product was referred to as B.

Figure 10:
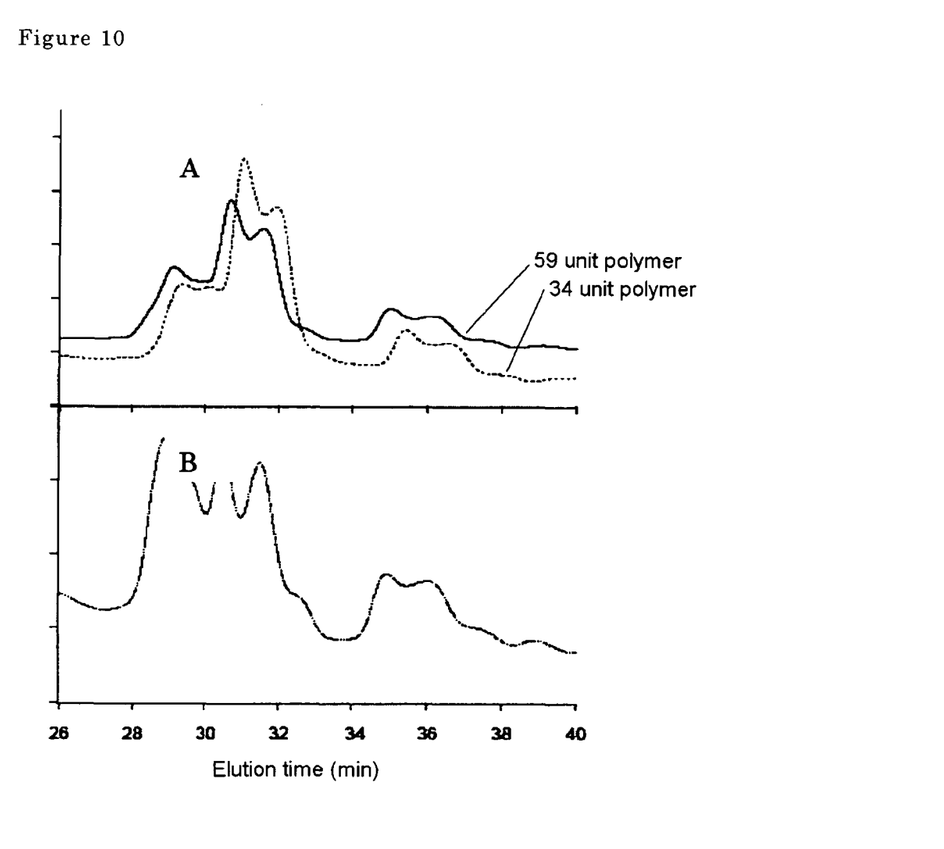
FIG. 10 shows GPC elution curves for the polymerized materials.

The GPC elution curves of the polymers formed were measured. (The device used: GPC pump PU-2089 manufactured by Nihon Bunko K.K. Refractive index detector RI-101 manufactured by Showa Denko K.K. UV detector MD-201 manufactured by Nihon Bunko K.K. The column used: Two Asahipak GF-310HQ manufactured by Showa Denko K.K.) The results are shown in FIG. 10.

Two types of products with different degrees of polymerization (polymerization time) were obtained as product A. When the average polymerization degrees of both were calculated using $^1$H-NMR, one contained fifty-nine units (solid line in FIG. 10A) and the other thirty-four (dotted line in FIG. 10A).

The area on the high molecular weight side (the area with a shorter elution time) on the GPC curves was found to increase with increasing average molecular weight as calculated using NMR.

In addition, the conventional type product B had a broad GPC curve indicating a broad molecular weight distribution (FIG. 10B), but the product A displayed a sharper GPC curve width indicating a narrow molecular weight distribution.

INDUSTRIAL APPLICABILITY

The polypyridinium obtained according to the production method of the present invention can be utilized as an electrode material with a function to store electrical power and an electrolytic material utilizing anion conductance, as a capacitor material utilizing high dielectricity, as a conjugated polymer with a giant dipole in the direction of the main chain in non-linear optical materials and ferroelectric materials, as an electrochromic material utilizing its multiple stage oxidation-reduction properties in display devices, as a conjugated polymer with a capability to form external site controlling type polyradicals in magnetic materials and as a disinfectant and the like.

What is claimed is:
1. A method for producing polypyridinium comprising reacting a polymerization initiator and a monomer represented by the chemical formula in an organic solvent in the presence of a dissolution accelerating agent comprising hydrophobic anions,
where R' represents a hydrogen atom, an alkyl group, an alkoxy group, a halogen atom, a nitro group, an ester group or an aromatic ring forming a condensed ring with the pyridine ring, m is an integer from 1 to 4 and Z represents a halogen atom,
wherein the polymerization initiator is 4-halopyridinium or its derivatives, 4-haloquinolinium or its derivatives, 9-haloacrydinium or its derivatives, 2- or 4-halopyrimidine or their derivatives, 3- or 4-halopyridazine or their derivatives, 2-halopyrazine or its derivatives, 2-, 4- or 5-haloimidazole or their derivatives, 3-, 4- or 5-halopyrazole or their derivatives, 3-, 4- or 5-haloisothiazole or their derivatives, 3-, 4- or 5-haloisooxazole or their derivatives, halotriazine, mononitro or polynitrohalobenzene or their derivatives, or polycyanohalobenzene or its derivatives.

2. The method of claim 1 wherein the polymerization initiator is a 4-halopyridinium represented by the chemical formula or its derivatives, where R represents R"(CH$_2$)$_n$—, wherein R" represents a hydrocarbon group or a heterocyclic group and n represents an integer that is at least one, or an aryl group or a heterocyclic ring that may contain substituents, however, the heterocyclic group has its carbon atom bonded to the nitrogen atom in the pyridine ring, X represents a halogen atom, Y represents an anion soluble in the organic solvent, R' represents a hydrogen atom, an alkyl group, an alkoxy group, a halogen atom, a nitro group, an ester group or an aromatic ring forming a condensed ring with the pyridine ring and m is an integer from 1 to 4.

3. The method of claim 2 wherein Y is a halide ion, perchlorate ion, tetrafluoroborate ion, hexafluorophosphate ion or tetraphenyl borate ion, X and Y are chlorine atoms or bromine atoms, and the hydrophobic anion is a perchlorate ion, a tetrafluoroborate ion, a hexafluorophosphate ion, a tartarate ion, a citrate ion, a nicotinate ion, or a phosphate ion containing a binaphthyl group.

4. The method of claim 1 wherein the dissolution accelerating agent is tetrabutylammonium perchlorate, tetrabutylammonium tetrafluoroborate, tetrabutylammonium hexafluorophosphate, sodium perchlorate, sodium tetrafluoroborate, sodium hexafluorophosphate, tetraethylammonium perchlorate, tetraethylammonium tetrafluoroborate, tetraethylammonium hexafluorophosphate, sodium tetraphenylborate, sodium p-toluenesulfonate, sodium alkylsulfonate having 6 to 24 carbon atoms, sodium alkylphosphate having 6 to 24 carbon atoms, or a phospholipid having 6 to 24 carbon atoms.

5. The method of claim 4 wherein the dissolution accelerating agent is tetrabutylammonium tetrafluoroborate.

6. The method of claim 5 wherein the polymerization initiator is N-(4'-tert-butylbenzyl)-4-chloropyridinium and the monomer is 4-chloropyridine.

7. The method of claim 1 further comprising reacting the reaction product with a polymerization terminating agent, wherein the polymerization terminating agent is pyridine, quinoline or acrydine substituted with amino groups, alkoxy groups or alkyl groups or their derivatives, triphenylphosphine or its derivatives, or amine derivatives substituted with alkyl groups or allyl groups.

8. The method of claim 7 wherein the polymerization terminating agent is added to the reaction solution to allow the reaction material to react with the polymerization terminating agent.

9. A polypyridinium produced by the method of claim 1.

10. The polypyridinium of claim 8 wherein the polypyridinium is represented by the chemical formula, where R represents R"(CH$_2$)$_{n-}$, wherein R" represents a hydrocarbon group or a heterocyclic group and n represents an integer that is at least one, or an aryl -group or a heterocyclic ring that may contain substituents, however, the heterocyclic group has its carbon atom bonded to the nitrogen atom in the pyridine ring, Z represents a halogen atom, R' represents a hydrogen atom, an alkyl group, an alkoxv group, a halogen atom, a nitro group, an ester group or an aromatic ring forming a condensed ring with the pyridine ring, m is an integer from 1 to 4 and o is 1 to 300.

11. The method of claim 3 wherein the dissolution accelerating agent is tetrabutylammonium perchlorate, tetrabutylammonium tetrafluoroborate, tetrabutylammonium hexafluorophosphate, sodium perchlorate, sodium tetrafluoroborate, sodium hexafluorophosphate, tetraethylammonium perchlorate, tetraethylammonium tetrafluoroborate, tetraethylammonium hexafluorophosphate, sodium tetraphenylborate, sodium p-toluenesulfonate, sodium alkylsulfonate having 6 to 24 carbon atoms, sodium alkylphosphate having 6 to 24 carbon atoms, or phospholipids having 6 to 24 carbon atoms.

12. The method of claim 11 wherein the dissolution accelerating agent is tetrabutylammonium tetrafluoroborate.

13. A polypyridinium produced by the method of claim 3.

14. The method of claim 6 further comprising reacting the reaction product with a polymerization terminating agent, wherein the polymerization terminating agent is pyridine, quinoline or acrydine substituted with amino groups, alkoxy groups or alkyl groups or their derivatives, triphenylphosphine or its derivatives, or amine derivatives substituted with alkyl groups or allyl groups.

15. The method of claim 14 wherein the polymerization terminating agent is added to the reaction solution to allow the reaction material to react with the polymerization terminating agent.

16. The method of claim 13 wherein the polymerization initiator is N-(4'-tert-butylbenzyl)-4-chloropyridinium and the monomer is 4-chloropyridine.

17. A polypyridinium produced by the method of claim 6.

18. The polypyridinium of claim 13 wherein the polypyridinium is represented by the chemical formula where R represents R"(CH$_2$)$_{n-}$, wherein R" represents a hydrocarbon group or a heterocyclic group and n represents an integer that is at least one, or an aryl group or a heterocyclic ring that may contain substituents, however, the heterocyclic group has its carbon atom bonded to the nitrogen atom in the pyridine ring, Z represents a halogen atom, R' represents a hydrogen atom, an alkyl group, an alkoxy group, a halogen atom, a nitro group, an ester group or an aromatic ring forming a condensed ring with the pyridine ring, m is an integer from 1 to 4 and o is 1 to 300.

19. The polypyridinium of claim 17 wherein the polypyridinium is represented by the chemical formula where R represents R"(CH$_2$)$_{n-}$, wherein R" represents a hydrocarbon group or a heterocyclic group and n represents an integer that is at least one, or an aryl group or a heterocyclic ring that may contain substituents, however, the heterocyclic group has its carbon atom bonded to the nitrogen atom in the pyridine ring, Z represents a halogen atom, R' represents a hydrogen atom, an alkyl group, an alkoxy group, a halogen atom, a nitro group, an ester group or an aromatic ring forming a condensed ring with the pyridine ring, m is an integer from 1 to 4 and o is 1 to 300.

* * * * *

UNITED STATES PATENT AND TRADEMARK OFFICE
CERTIFICATE OF CORRECTION

| | |
|---|---|
| PATENT NO. | : 7,985,829 B2 |
| APPLICATION NO. | : 10/593176 |
| DATED | : July 26, 2011 |
| INVENTOR(S) | : Iyoda et al. |

It is certified that error appears in the above-identified patent and that said Letters Patent is hereby corrected as shown below:

Col. 10, line 30
Claim 2, Formula
  replace "$R''(CH_2)_n\_\_\_,$"
  with --$R''(CH_2)_n—,$--

Col. 11, line 19
Claim 10, Formula
  replace "$R''(CH_2)_n\_\_\_,$"
  with --$R''(CH_2)_n—,$--

Col. 12, line 19
Claim 18, Formula
  replace "$R''(CH_2)_n\_\_\_,$"
  with --$R''(CH_2)_n—,$--

Col. 12, line 39
Claim 18, Formula
  replace "$R''(CH_2)_n\_\_\_,$"
  with --$R''(CH_2)_n—,$--

Col. 11, line 9
Claim 10, Dependency
  replace "The polypyridinium of claim 8"
  with --The polypyridinium of claim 9--

Signed and Sealed this
Third Day of January, 2012

David J. Kappos
*Director of the United States Patent and Trademark Office*